United States Patent [19]
Nohmi et al.

[11] Patent Number: 5,341,506
[45] Date of Patent: Aug. 23, 1994

[54] DATA FLOW PROCESSOR WITH A FULL-TO-HALF WORD CONVERTOR

[75] Inventors: Hitoshi Nohmi; Katsutoshi Nakada, both of Tokyo, Japan

[73] Assignee: NEC Corporation, Tokyo, Japan

[21] Appl. No.: 688,089

[22] Filed: Apr. 22, 1991

Related U.S. Application Data

[63] Continuation-in-part of Ser. No. 326,370, Mar. 21, 1989, abandoned, which is a continuation-in-part of Ser. No. 806,558, Dec. 9, 1985, abandoned.

[30] Foreign Application Priority Data

Dec. 10, 1984 [JP] Japan .................. 59-260376

[51] Int. Cl.$^5$ .................. G06F 13/00; G06F 13/38; G06F 15/00; G06F 15/82
[52] U.S. Cl. .................. 395/800; 364/931.11; 364/940.63; 364/951.3; 364/DIG. 2
[58] Field of Search .............. 395/800, 775, 500, 425, 395/375, 275, 250, 200

[56] References Cited

U.S. PATENT DOCUMENTS

Re. 34,052 9/1992 Hester et al. .................. 395/375
4,663,732 5/1987 Robinson .................. 395/425

OTHER PUBLICATIONS

Watson, et al. "A practical data flow computer", Computer, vol. 15, No. 2, Long Beach, U.S., Feb. 1982, pp. 51-57.
Thurber, et al. "Systematic Approach to Design of Digital Bussing Structures", Fall Joint Computer Conference, 1972, p. 731.

Primary Examiner—Alyssa H. Bowler
Assistant Examiner—Alpesh M. Shah
Attorney, Agent, or Firm—Foley & Lardner

[57] ABSTRACT

In a dataflow processor, double precision data segments of higher and lower significant bits and like segments of single precision data are read out of a memory and appended with a tag to form packets. The packets are forwarded to a ring bus to which computing modules are connected. Each module includes an interface which forwards the packet onto the bus if another module is the destination. If the packet is destined to the own module, the packet is split into a tag and a data segment. If the tag indicates that the data segment is double precision data, it is assembled with the companion segment of a previous packet into a double precision data word. Otherwise, it is translated to a single precision data word of the same bit width as the double precision data word. A data set is formed by successive double precision data words or by successive single precision data words. A variable is generated indicating if the data words in each set are double or single precision data and indicating what computation is to be performed thereon. Computed double precision data are separated into data segments of higher and lower significant bits and a tag is appended to each of the separated data segments to form a packet and computed single precision data are translated to data segments of single precision data segment and a tag is appended to it to form a data packet. Each computed data packet is forwarded back to the bus for further computations.

2 Claims, 6 Drawing Sheets

TAG TABLE 46

| TAG | SINGLE (=0) OR DOUBLE(=1) | HIGHER/LOWER |
|---|---|---|
| 00000000 | 0 | — |
| 00000001 | 0 | — |
| 00000010 | 1 | 1/0 |
| 00000011 | 1 | 1/0 |
| 00000100 | 0 | — |
| 00000101 | 1 | 1/0 |
| ⋮ | ⋮ | ⋮ |
| 11111101 | 1 | 1/0 |
| 11111110 | 0 | — |
| 11111111 | 1 | 1/0 |

LEGEND:
DH(A): HIGHER 32-BIT DOUBLE PRECISION DATA (A)
DL(A): LOWER-32-BIT DOUBLE PRECISION DATA (A)
S(C): SINGLE PRECISION DATA (C)
D(A): 64-BIT DOUBLE PRECISION DATA (A)

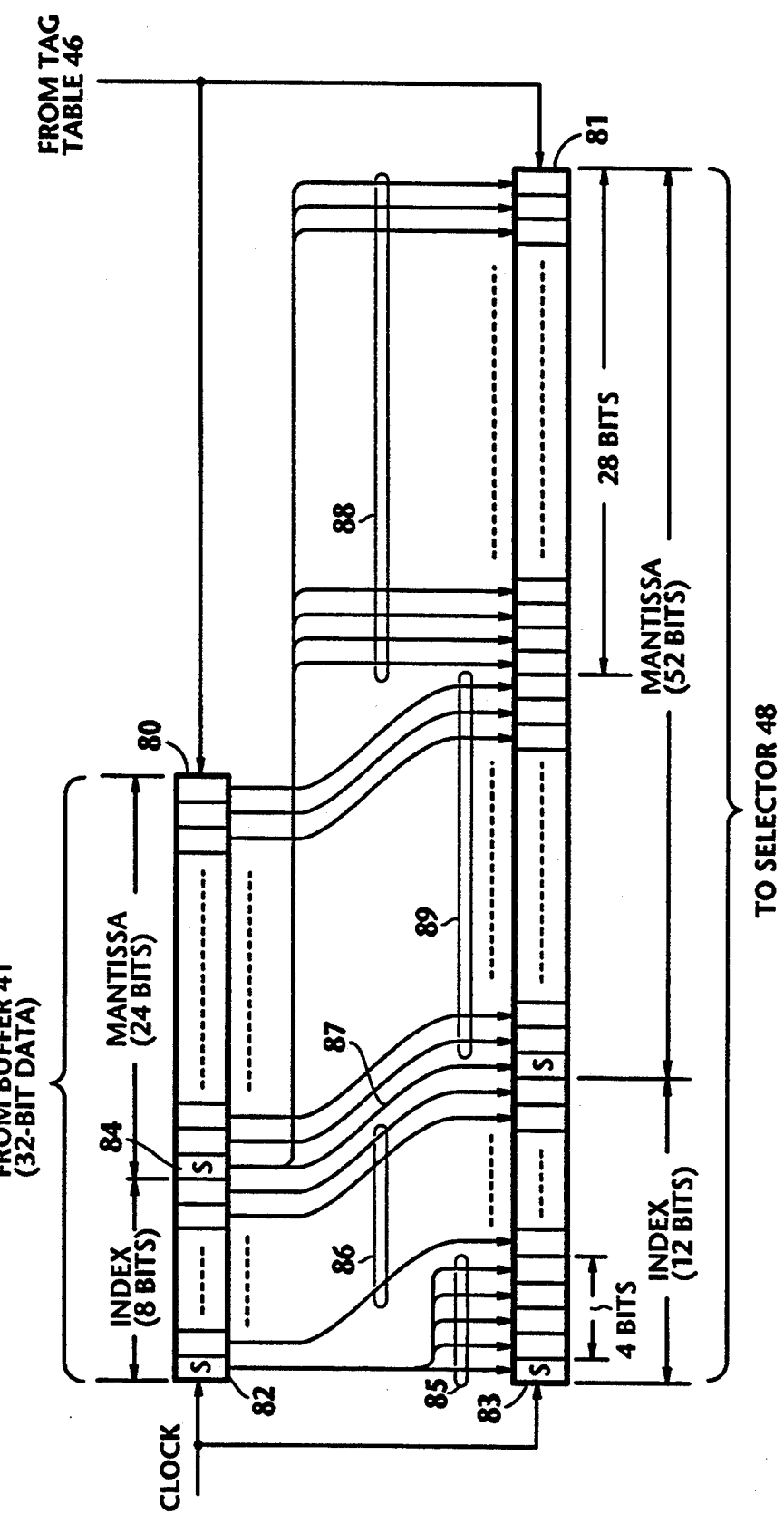

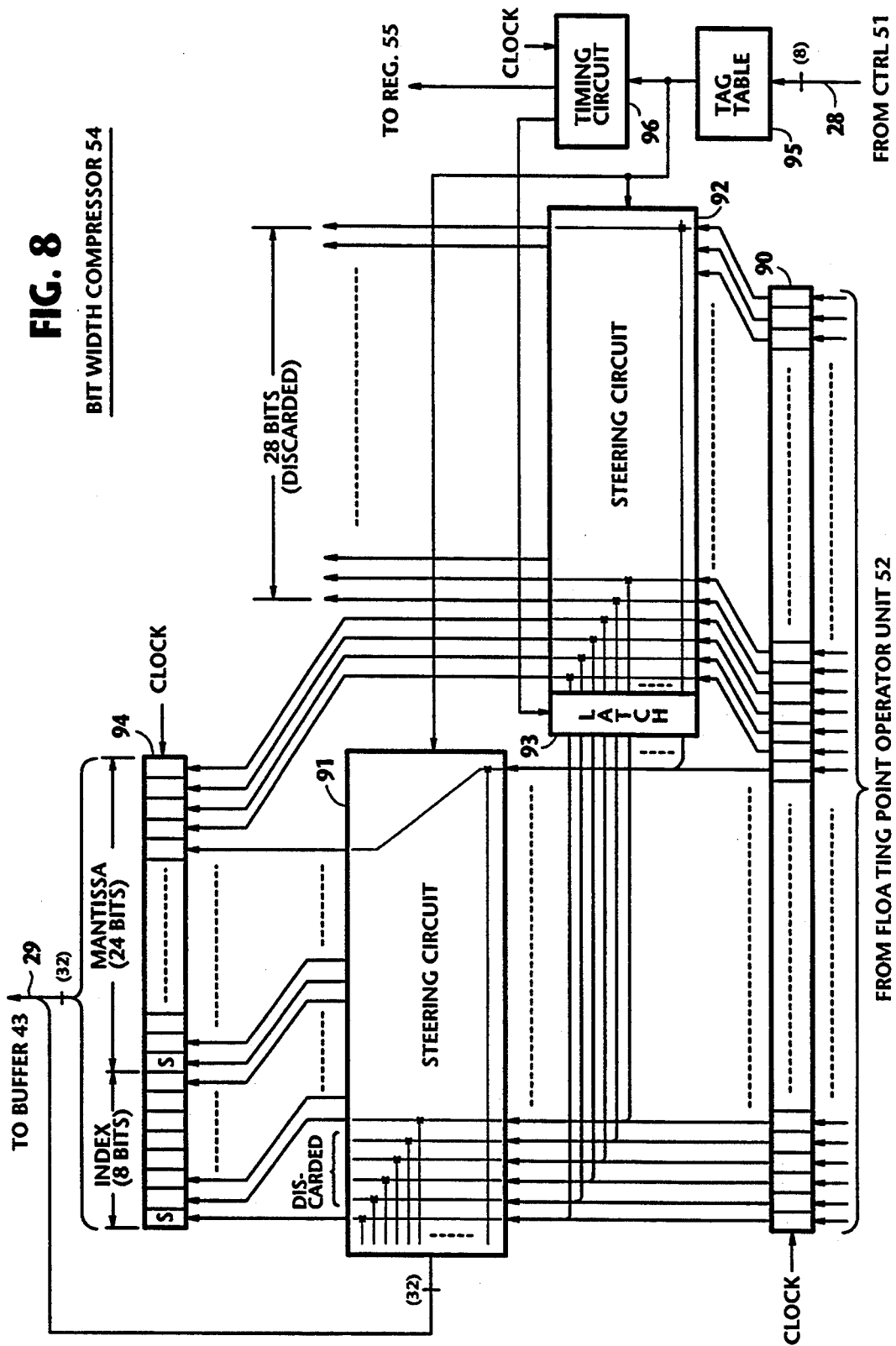

DATA FLOW PROCESSOR WITH A FULL-TO-HALF WORD CONVERTOR

CROSS REFERENCE TO RELATED APPLICATIONS

This application is a continuation-in-part application of a continuation-in-part application Ser. No. 07/326,370, filed Mar. 21, 1989, now abandoned, of U.S. patent application, Ser. No. 06/806,558 filed Dec. 9, 1985, now abandoned.

BACKGROUND OF THE INVENTION

The present invention relates to a dataflow processor having a plurality of computing modules connected to a ring bus.

In conventional dataflow processors, a packet comprising data bits and additional tag bits specifying the type of computation to be performed thereon is forwarded onto a ring bus to which a plurality of computing modules are connected. Each computing module includes a bus interface that inspects the contents of the tag to determine that the packet is destined to the own module. A queuing circuit is provided to assemble packets destined to the own module to form a data set. A computing logic receives the data set and performs a particular computation specified by the tag and forwards the result of the computation back to the ring bus through the bus interface with a tag appended to it for further computations by other computing modules.

It has been desired to process both double precision data and single precision data on a dataflow processor to take advantage of its high speed capability. Since double precision data has twice as much bit width as that of single precision data, all components of a single-precision dataflow processor must be doubled to handle the double precision data. In particular, the bus interface of each computing module usually comprises buffers for interfacing between the ring bus and the components of the module. If a single precision dataflow processor is redesigned to handle double precision data as well as single precision data, the storage capacity of the buffers of the interface must be doubled. This substantially increases the amount of hardware of the dataflow processor.

SUMMARY OF THE INVENTION

It is therefore an object of the present invention to provide a dataflow processor that is capable of handling both double and single precision data without substantially increasing the amount of hardware.

According to the present invention, a dataflow processor comprises a ring bus having a bit width greater than the bit width of single precision data but smaller than the bit width of double precision data, a data memory for storing double and single precision data as data segments of equal bit width such that the double precision data is made up of a companion segment of higher significant bits and a like companion segment of lower significant bits. Data segments of either double or single precision data are read out of the data memory in accordance with program instructions and a tag is appended to each data segment to form a data packet, which is forwarded onto the ring bus. The tag identifies a destination computing module and identifies the associated data packet as a companion data segment of higher or lower significant bits of double precision data, or single precision data. A plurality of computing modules are serially connected by the ring bus. Each computing module comprises an interface which responds to the contents of the tag of a data packet received from the bus by splitting it into the tag and the data segment or forwarding the received packet onto the ring bus. A half-to-full word converter is responsive to the tag of each packet. If the tag identifies the packet as a data segment of higher significant bits, the half-to-full word converter stores it into a memory and if the tag of a subsequent data packet identifies it as a companion data segment of lower significant bits, it assembles the data segment of the lower significant bits with the stored data segment into a double precision data word. If the tag identifies the packet as a data segment of single precision data, the converter translates it into a single precision data word of the same data format as the double precision data word. A queuing circuit is provided for sequentially receiving the double and single precision data words from the half-to-full word converter to form a data set. The queuing circuit generates a variable indicating whether the data segments in the data set are double or single precision data and indicating what computation is to be performed on the data set. A computing logic performs computations on the data set in accordance with the contents of the variable and supplies a computed data word to a full-to-half word converter, which inspects the contents of the variable from the queuing circuit. If the variable indicates that the computed data set is double precision data, the full-to-half word converter separates the computed data word into a sequence of companion data segments of higher and lower significant bits and appends a tag to each of the separated data segments to form data packets and forwards them back to the interface. If the variable indicates that the computed data set is single precision data, the full-to-half word converter translates the computed data word to a data segment of single precision data and appends a tag to the translated data segment to form a data packet and forwards it back to the interface where it is multiplexed with data packets from the ring bus.

Since the bit width of the ring bus that carries every packet is considerably smaller than the bit width of the double precision data, the bus interface circuitry of each computing module can be implemented with the amount of hardware necessary to process the single precision data. Since the buffers that comprise each bus interface account for a substantial amount of hardware, the saving of these buffer storage capacity can minimize the total hardware of the dataflow processor.

BRIEF DESCRIPTION OF THE DRAWINGS

The present invention will be described in further detail with reference to the accompanying drawings, in which:

FIG. 7 is a block diagram illustrating the details of the bit width expander of the half-to-full word converter; and FIG. 8 is a block diagram illustrating the details of the bit width compressor of the full-to-half word converter.

DETAILED DESCRIPTION

Figure 1:
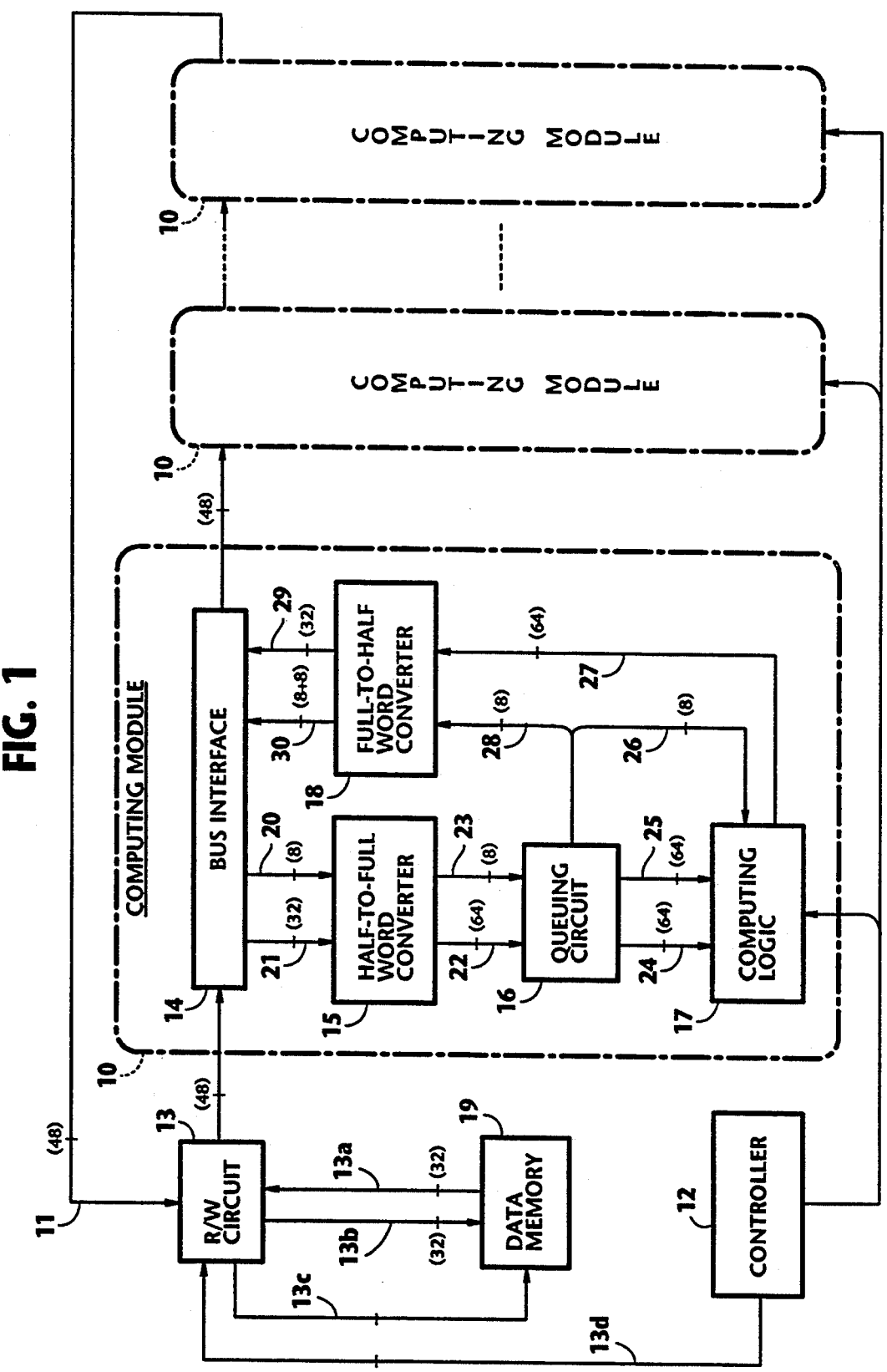
FIG. 1 is a schematic block diagram of a dataflow processor of the present invention.

Referring now to FIG. 1, there is shown a dataflow processor according to a preferred embodiment of the present invention. The dataflow processor comprises a plurality of computing modules 10 successively connected in a 48-bit wide ring bus 11. Each computing module 10 is pre-loaded with a program which is supplied from a controller 12. Double and single precision data to be processed by the dataflow processor are stored in a data memory 19. The double precision data is a 64-bit word which is read out of data memory 19 as a sequence of two 32-bit wide halfwords, or double-precision data segments and the single precision data is a 32-bit word which is read out of the memory as a 32-bit wide fullword, or a single-precision data segment. Each precision data is appended with two 8-bit tags and forwarded onto ring bus 11 as a 48-bit wide data packet to computing modules 10. A read/write circuit 13 is connected via 32-bit wide input and output buses 13a, 13b and a read address bus 13c to data memory 19 and by way of a control bus 13d to controller 12 in order that data segments are read out of memory 19 and forwarded onto ring bus 11 and data segments received from ring bus 11 are written into the data memory 19. This read/write circuit thus serves as an interface between data memory 19 and ring bus 11.

Figure 2:
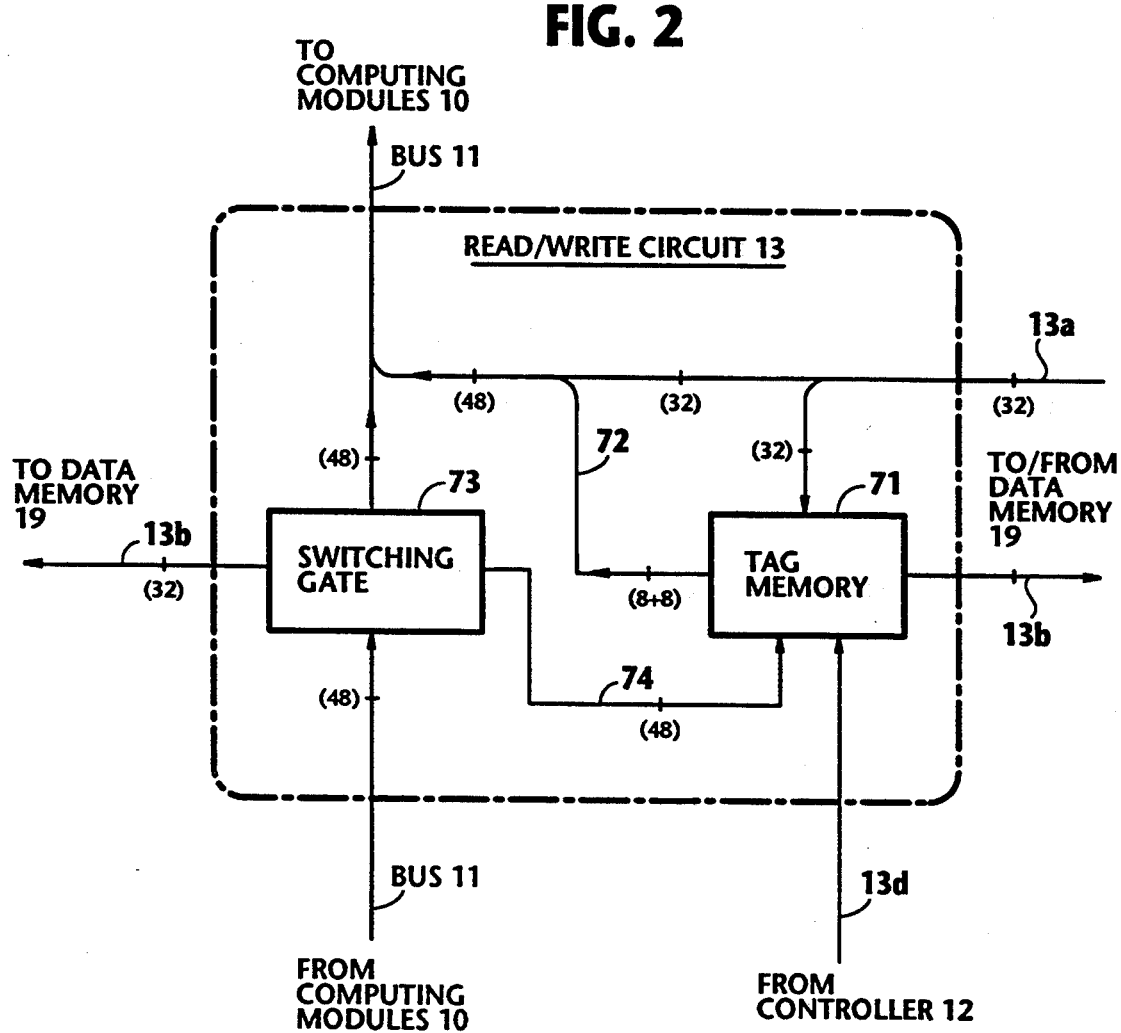
FIG. 2 is a block diagram of the read/write circuit of FIG. 1.
Figure 3:
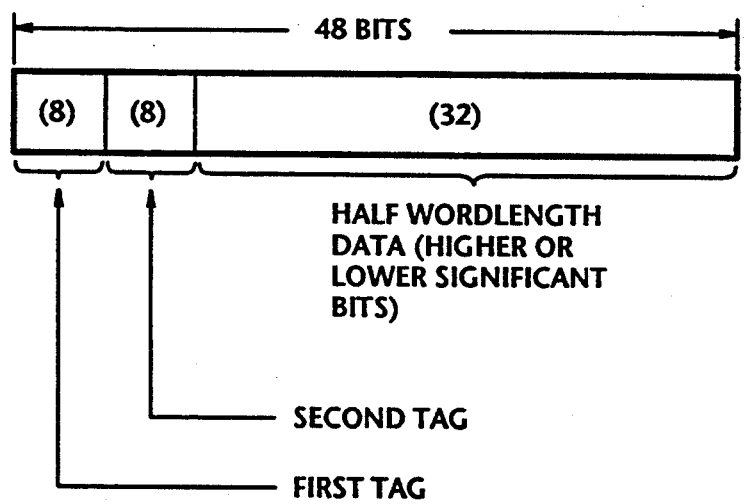
FIG. 3 is an illustration of the data structure of packets propagating through the ring bus of FIG. 1.

As shown in FIG. 2, read/write circuit 13 includes a tag memory 71 which is connected by control bus 13d to the controller 12 to store tags and read address information relating to the data stored in the memory 19 and identification data indicating whether the data to be read out of the data memory is double precision data or single precision data. For a particular computation, tag memory 71 stores read addresses which enable it to read the necessary 32-bit length data segments from data memory 19 and first and second tags of 8 bits each which are to be appended to each 32-bit length data segment read out of the data memory 19. A sequence of double-precision data segments and a single-precision data segments from data memory 19 are supplied via 32-bit wide input data bus 13a to tag memory 71 in accordance with the read addresses of a particular computation. On receipt of each 32-bit data segment, tag memory 71 generates first and second 8-bit tags in accordance with the identification data of that particular computation and supplies them through an (8+8)-bit wide bus 72 to ring bus 11. The data segments read out of data memory 19 are also forwarded onto ring bus 11 and combined with tags read out of tag memory 71 to form a 48-bit data packet as shown in FIG. 3.

Read/write circuit 13 further includes a switching gate 73 which examines the contents of the tags appended to each data packet propagating through ring bus 11 to determine whether the packet is to be forwarded through ring bus 11 to computing modules 10 or through the 32-bit wide output bus 13b to data memory 19, or forwarded to tag memory 71 through a 48-bit wide bus 74. The first 8-bit tag indicates the destination of the packet and the second 8-bit tag indicates its variable (packet identification and double or single precision identification). A computation begins with the sending of a token packet from one of the computing modules 10 to read/write circuit 13. Switching gate 73 examines the second tag (variable) of the token packet and forwards it through bus 74 to tag memory 71 to allow it to proceed with the necessary read operation in a manner mentioned above.

Returning to FIG. 1, each computing module 10 comprises a bus interface 14, a half-to-full word converter 15, a queuing circuit 16, a computing logic 17 and a full-to-half word converter 18. Bus interface 14 receives packets on bus 11 and inspects the first tag of each packet to determine if it specifies the own computing module, and if so, it sends the second tag of the packet on an 8-bit wide bus 20 to the half-to-full word converter 15 and the 32-bit data segment of the packet on a 32-bit wide bus 21 to converter 15. If the first tag of a received packet specifies another computing module, the bus interface 14 forwards it onto the bus 11.

If more than one computing module 10 attempts to access a given destination module, the order of packets arriving at the destination module is indeterminate. Half-to-full word converter 15 checks the contents of the tag received through the 8-bit line bus 20 appended to each arriving packet to see if that packet is a double precision data segment and if the higher 32-bit companion segment of the data is already received. If these conditions are met, converter 15 waits for the lower 32-bit companion segment and, on receiving it, assembles them to form a 64-bit double precision data word and forwards it through a 64-bit line output bus 22 to queuing circuit 16. The tag associated with the 64-bit data word is applied through an 8-bit wide bus 23 to queuing circuit 16. If the tag received from the interface indicates single precision data, half-to-full word converter 15 expands the corresponding data segment from the interface to a 64-bit single precision data word in a manner as will be described, and forwards the expanded data word to queuing circuit 16.

Queuing circuit 16 is a known circuit which stores a successive 64-bit data word from converter 15 until it receives another 64-bit data word which is necessary to form a data set with the stored data word for a particular computation, whereupon it sends the data words of the set on 64-bit wide buses 24 and 25 to computing logic 17. Queuing circuit 16 further generates an 8-bit variable which indicates whether each data set is double or single precision data and what computation is to be performed on each data set and sends the variable on an 8-bit wide bus 26 to computing logic 17 and further on an 8-bit wide bus 28 to full-to-half word converter 18.

Computing logic 17 performs computation in accordance with the program loaded from controller 12 and supplies the results of each computation on a 64-bit wide bus 27 to full-to-half word converter 18.

On receipt of a 64-bit data word on bus 27 from computing logic 17, full-to-half word converter 18 determines whether it should be sent to the next computing module as double precision data or single precision data based on the contents of the 8-bit tag (variable) supplied from the queuing circuit 16. If converter 18 determines that the input data word be sent as double precision data, the input data word is divided into a higher 32-bit data segment and a lower 32-bit data segment, each being appended with first and second 8-bit tags according to the program loaded from the controller 12. These 32-bit data are supplied to bus interface 14 through a 32-bit wide bus 29 and the first and second tags are sent an (8+8)-bit wide bus 31 to the bus interface 14. Conversely, if full-to-half word converter 18 determines that the input data word be sent as single precision data, it proceeds to compresses its 64-bit format to the 32-bit format in a manner inverse to that performed on the single precision data by half-to-full word converter 15 and appends to that 32-bit single precision data segment and generates first and second tags in the same manner as with the double precision data and forwards them to the bus interface 14. In this way, each 32-bit data segment, either double or single precision, is forwarded to the ring bus 11 for further computations.

Figure 4:
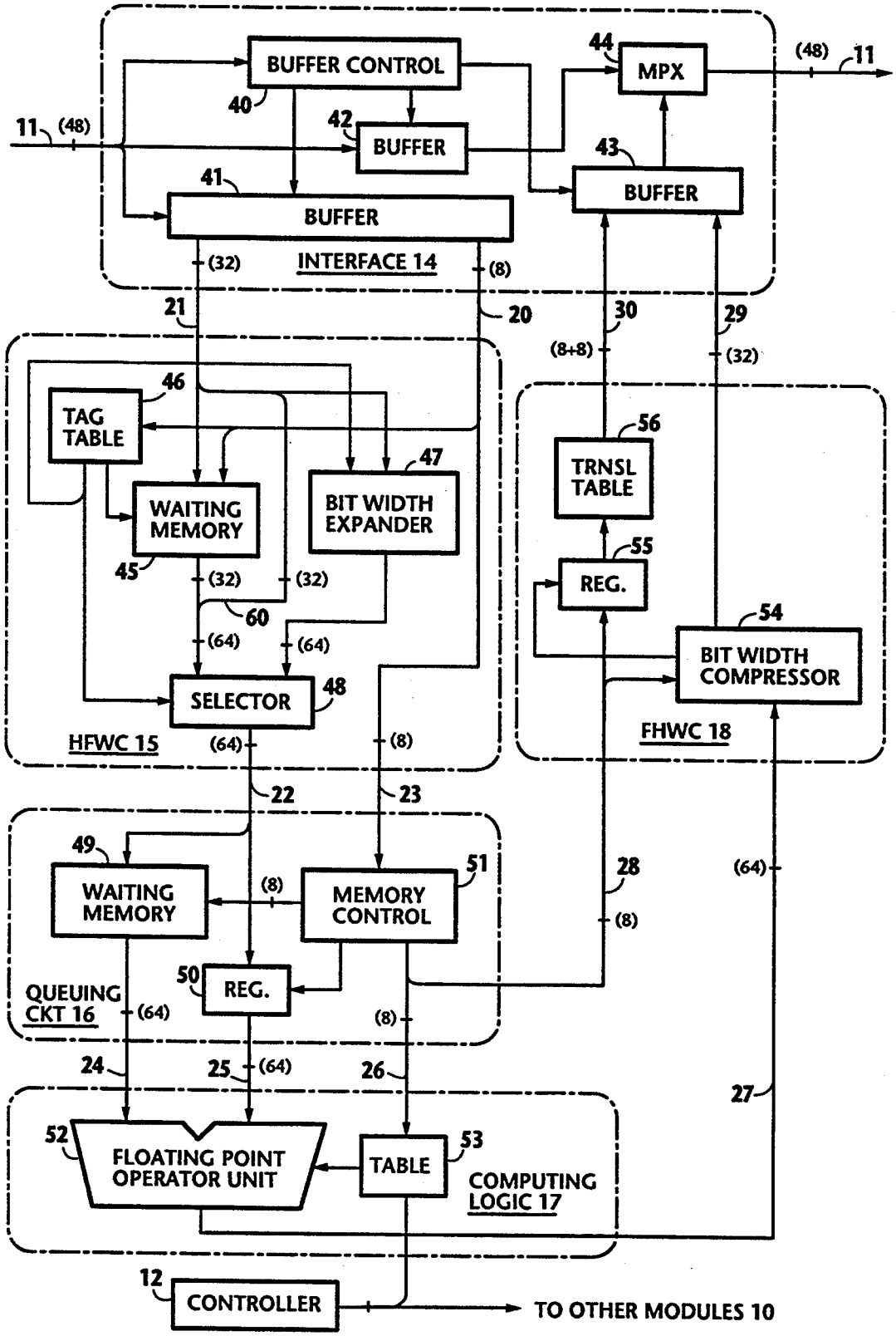
FIG. 4 is a block diagram illustrating the details of each computing module of FIG. 1.

Referring to FIG. 4, bus interface 14 comprises a buffer controller 40, an input buffer 41, a transfer buffer 42 and an output (first-in-first-out) buffer 43, and a multiplexer 44. Data packets from read/write circuit 13 are applied to buffers 41 and 42 to produce copies of each packet, and applied further to buffer controller 40. The latter inspects the first tag of each packet to determine if it specifies the own computing module or not. If another computing module is specified by that tag, controller 40 directs the input buffer 41 to discard the copy of the packet and directs the transfer buffer 42 to forward that copy to the multiplexer 44 to be multiplexed with other packets from the output buffer 43 to be passed on to ring bus 11. If a packet is directed to the own computing module, controller 40 directs the transfer buffer 42 to discard the copy of this packet and directs the input buffer 41 to forward the second tag (variable) on a bus 20 and 32-bit data segment of the copy of this packet on bus 21.

Figures 5, 6:
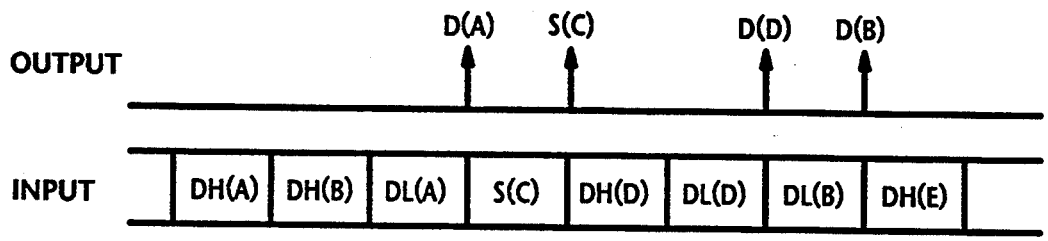
FIG. 5 is an illustration of the translation table of FIG. 4.
FIG. 6 is a schematic illustration of input data to the half-to-full word converter of FIG. 4 and the output timing of the converter.

Half-to-full word converter 15 includes a waiting memory 45 having a capacity of 256×32 bits, a tag table 46, a bit width expander 47 and a selector 48. The 32-bit data segment on bus 21 is applied to waiting memory 45 and to the double-precision data input of selector 48 through bus 60 as well as to bit width expander 47. As shown in FIG. 5, tag table 46 has 256 storage locations each of which is accessible by the 8-bit tag on bus 20. In each storage location of table 46 is prestored a single/double precision identifier for identifying each of the second 8-bit tags, i.e., binary 0 identifying single precision data and binary 1 identifying double precision data. Also stored in each of the address locations which are only associated with the tags of double precision data is a binary 1 which indicates that a higher 32-bit data segment is already stored in a location of waiting memory 45 which corresponds to the input tag, or a binary 0 indicating that no data segment is stored in the corresponding location. In response to the input tag, tag table 46 retrieves a single/double identifier bit for coupling to the control input of selector 48 as a switching signal, as well as to bit width expander 47 and further retrieves a higher/lower identifier bit for coupling to waiting memory 45 as a read/write enable signal.

In the dataflow processor, a sequence of data segments appears on bus 21 such that the higher 32-bit segment of each double precision data may appear earlier than its lower 32-bit companion segment and the latter may not necessarily appear immediately following it. One example is shown in FIG. 6 in which the higher 32-bit data segment (DH) of double precision data (A) appears first and the tag appending to the data segment causes tag table 46 to read a binary 0 from the corresponding higher/lower identifier bit location for writing that data segment into memory 45, while rewriting a binary 1 into that bit location. Likewise, the following higher 32-bit data segment (DH) of double precision data (B) is stored into waiting memory 46. The lower 32-bit companion segment (DL) of data (A) then appears and tag table 46 reads a binary 1 from the corresponding higher/lower identifier bit location and supplies it to waiting memory 45 as a read enable signal, so that the higher 32-bit companion segment is read out of waiting memory 45 and combined with the lower bit companion segment to form a 64-bit double precision data word (A) at the double-precision data input of selector 48. Simultaneously, tag table 46 supplies a binary 1 to the control input of selector 48 to forward the 64-bit double precision data word (A) onto bus 22.

When a single precision data segment (C) appears, tag table 46 reads a binary 0 from the corresponding single/double identifier bit location and supplies it to the control input of selector 48 to cause it to couple the 64-bit output of bit width expander 47 to bus 22. In such instances, no read/write enable signal is applied to waiting memory 45. Higher- and lower-bit segments of data (D) then appear in sequence and are combined together at the time of arrival of the lower-bit companion segment. The lower-bit segment of data (B) may appear following data (D). The higher-bit companion segment which has been stored in memory 45 following the arrival of the higher-bit data segment (A) is now combined with the lower-bit companion segment.

Each 32-bit wide single precision data is converted to 64-bit wide single precision data by bit width expander 47. In one example, the index and mantissa parts of floating point data are represented by two's complements. As illustrated in FIG. 7, bit width expander 47 comprises a 32-bit input register 80 and a 64-bit output register 81. From buffer 41, each 32-bit data segment is supplied to input buffer 80 in which it is segmented into an 8-bit index part and a 24-bit mantissa part, the leftmost (first) bit position (indicated by numerals 82 and 84) of each part being occupied by a sign bit S. Output buffer 81 is segmented into a 12-bit index part and a 52-bit mantissa part, each segmented part receiving a sign bit in the leftmost (first) position of each part. The sign bit position 82 of index part of input register 80 is connected to the sign bit position 83 as well as to the 2nd to 5th bit positions of index part of output register 81 by conductors 85. The second to eighth bit positions of index part of input register 80 are respectively coupled to the 6th to 12th bit positions of index part of output register 81 by conductors 86. The sign bit position (indicated by numeral 84) of mantissa part of input register 80 is connected to the sign bit position as well as to the 25th to 52nd positions of mantissa part of output register 81 by conductors 87 and 88, and the 2nd to 24th bit positions of mantissa part of register 80 are connected to the 2nd to 24th bit positions of mantissa part of output register 81 by conductors 89.

Therefore, the 2nd to 5th bit positions of the output index part are loaded with all 1's or all 0's according to the sign bit of the loaded with all 2's or all 0's according to the sign bit of the input index part and the 25th to 52nd bit positions (i.e., 37th and 64th positions of register 81) of the output mantissa part are loaded with all 1's or all 0's according to the sign bit of the input mantissa part. Input and output registers 80 and 81 are enabled in response to a binary 0 input from tag table 46 which occurs when a single precision data segment is received as described above.

Single precision values in hexadecimal notation of corresponding decimal numbers 0.25, 0.5, 1.0 and 2.0 are respectively translated to double precision values of hexadecimal notation as follows:

| Decimal Number | Single Precision | Double Precision |
|---|---|---|
| 0.25 | FF400000 | FFF4000000000000 |
| 0.5 | 00400000 | 0004000000000000 |
| 1.0 | 01400000 | 0014000000000000 |
| 2.0 | 02400000 | 0024000000000000 |

The expanded 64-bit single precision data word from output register 81 is supplied to the single-precision data input of selector 48. In response to a binary 0 input from tag table 46, selector 48 couples the output of bit width expander 47 through bus 22 to queuing circuit 16.

Queuing circuit 16 includes a waiting memory 49, a 64-bit register 50 and a memory controller 51. A 64-bit data segment of either double or single precision data on bus 22 is stored into waiting memory 49 and register 50, and the corresponding (second) tag on bus 23 is supplied to memory controller 51. Memory controller 51 inspects the contents of the tag and identifies a subsequent 64-bit data word as a companion data word that forms a set with the data word now stored in memory 49. When the subsequent companion data word is stored in register 50, controller 51 reads the previous 64-bit data word from waiting memory 49 and forwards it onto 64-bit wide bus 24 and enables register 50 to forward the subsequent companion data word onto bus 25, and forwards a "variable" onto buses 26 and 28.

Computing logic 17 includes a floating point operator unit 52 which receives successive data words via buses 24 and 25, and a table memory 53 which receives successive variables from memory controller 51. Table memory 53 is loaded with a program from controller 12 and uses it to decode the variable and supplies information to floating point operator unit 52 to perform computation and the results of the computation are supplied to full-to-half word converter 18.

Full-to-half word converter 18 includes a bit width compressor 54 to which is supplied the output of floating point operator unit 52 and the corresponding variable from memory controller 51. The variable is also applied to a register 55 and forwarded to a translation table 56 in response to a timing signal from bit width compressor 54. The first and second tags are stored in locations of translation table 56 addressable as a function of the variable. The first and second tags are read out of table 56 in response to the input variable and delivered in parallel onto the (8+8)-bit bus 30 to buffer 43.

As shown in FIG. 8, bit width compressor 54 comprises a 64-bit input register 90 for receiving the output of floating point operator unit 52. A steering circuit 91 is connected to the higher 32-bit positions of input register 90 and a steering circuit 92 is connected to the lower 32-bit positions of input register 90. Steering circuit 91 steers the input data to a 32-bit output register 94 with the exception of those in the 2nd to 5th bit positions when the input is single precision data or steers the input data to 32-bit wide bus 29 when the input is double precision data. Steering circuit 93 steers the 33rd to 36th bit positions of input register 90 to the 29th to 32nd bit positions of output register 94, while discarding data in the 37th to 64th bit positions, when the input data is single precision data, and steers the input data to a latch 93 when the input is double precision data. The outputs of latch 93 are connected to all input terminals of steering circuit 91 as illustrated. A tag table 95 is provided to receive variables from controller 51 to determine if their corresponding data inputs from floating point operator unit 52 are double or single precision data and applies switching signals to both steering circuits according to the determinations. The output of tag table 95 is also applied to a timing circuit 96 to cause it to apply a pulse to latch 93 to forward the stored lower 32-bit data segment of double precision data onto bus 29 through steering circuit 91 in succession to the higher 32-bit companion segment.

It is seen that in the case of single precision data the additionally inserted four bits in the index part and the additionally inserted twenty-eight bits in the mantissa part are discarded from the expanded 64-bit single precision data and the rest of the data is supplied to output register 94 and forwarded onto bus 29.

Timing circuit 96 further supplies a timing signal to register 55 to forward the stored variable to translation table 56 at appropriate timing so that data on bus 29 and its corresponding tags appear simultaneously on buses 29 and 30.

Thus, output buffer 43 is supplied with a 32-bit data segment of either double or single precision data and two 8-bit tags to form a 48-bit data packet. In response to a signal from the buffer controller 40, the output buffer 43 forwards the stored data packet to the multiplexer 44 in which it is multiplexed with other data packets from transfer buffer 42 and forwarded onto ring bus 11.

Since the bit width of the ring bus 11 that carries every packet is considerably smaller than the bit width of double precision data, the bus interface circuitry of each computing module can be implemented with the amount of hardware necessary to process the single precision data. Since the buffers that comprise the bus interface 14 account for a substantial amount of hardware, the saving of these buffer storage capacity results in savings of the overall hardware of dataflow processors.

What is claimed is:

1. A dataflow processor for processing double and single precision data in accordance with a program, comprising:

a ring bus having a bit width greater than a bit width of said single precision data but smaller than a bit width of said double precision data;

a plurality of computing modules serially connected by said ring bus;

a data memory for storing said double and single precision data as data segments of equal bit width, said double precision data being made up of a companion data segment of higher significant bits and a like companion data segment of lower significant bits; and means for sequentially reading data segments of either double or single precision data from said data memory in accordance with said program, appending a tag to each of the data segments read out of said memory to form a data packet and forwarding the data packet to said ring bus, said tag of each data packet identifying one or the other of said computing modules as a destination of the data packet and identifying the data packet as the single precision data or one of the companion data segments of the double precision data;

each of said computing modules comprising:

interface means responsive to the tag of said data packet received from said ring bus for forwarding the received data packet to said ring bus or decomposing the received data packet into a decomposed tag and a decomposed data segment;

half-to-full word converter means including a waiting memory and means responsive to the decomposed tag of each said data packet supplied from the interface means for storing the decomposed data segment of the data packet into said waiting memory if said decomposed tag identifies the decomposed data segment as one of the companion data segments and assembling the stored decomposed data segment with the decomposed data segment of a subsequently received data packet into a double precision data word if the tag of the subsequent data packet identifies the data segment contained therein as the other of said companion data segments, and translating the decomposed data segment of each said data packet supplied from the interface means to a single precision data word having a format of said double precision data word if said decomposed tag identifies the decomposed data segment as the single precision data;

queuing means for sequentially receiving the data words of either the double or single precision data from said half-to-full word converter means, forming a data set with successively received data words and generating a variable identifying each data set as the double or single precision data and indicating which computation is to be performed on said data set;

computing logic means for performing computation on the data words of each data set in accordance with said variable to produce a computed data word; and full-to-half word converter means responsive to said variable identifying the data set as the double precision data for separating the computed data word into the companion data segments of higher and lower significant bits, appending said tag to each of said separated companion data segments to form data packets and forwarding same to said interface means, and responsive to said variable identifying the data set as the single precision data for translating the computed data word to a data segment of single precision data format, appending said tag to the translated data segment to form a data packet, and forwarding same to said interface means, said interface means multiplexing data packets from said full-to-half word converter means with data packets from said ring bus.

2. In a dataflow processor for processing double and single precision data in accordance with a program, the processor having a ring bus with a bit width greater than a bit width of said single precision data but smaller than a bit width of said double precision data, a method comprising the steps of:

a) storing said double and single precision data as data segments of equal bit width into a data memory, said double precision data being made up of a companion data segment of higher significant bits and a like companion data segment of lower significant bits;

b) sequentially reading data segments of either the double or single precision data from said data memory in accordance with said program;

c) appending a tag to each of the data segments read out of said data memory to form a data packet and forwarding the data packet to said ring bus, said tag identifying the data packet as the single precision data or one of the companion data segments of the double precision data and identifying a destination;

d) receiving the data packet from said ring bus and decomposing the received data packet into a decomposed tag and a decomposed data segment when the destination identified by said decomposed tag matches a particular value or forwarding the received data packet to said ring bus when said destination does not match the particular value;

e) inspecting the data identifier of said decomposed tag to determine if the decomposed data segment is one or the other of the companion data segments of the double precision data, or the single precision data;

f) if the step (e) determines that the decomposed data segment of each said received data packet is one of the companion data segments, storing the decomposed data segment of the data packet into a waiting memory, and if the step (e) determines that the decomposed data segment of a subsequently received data packet is the other of the companion data segments, assembling the decomposed data segment of the subsequently received data packet with the stored data segment into a double precision data word, and if the step (e) determines that the decomposed data segment of each said received data packet is the single precision data, translating the decomposed data segment into a single precision data word having a format of said double precision data word;

g) forming a data set with a plurality of said double precision data words or a data set of a plurality of said single precision data words and generating a variable identifying each data set as the double or single precision data and indicating what computation is to be performed on said data set;

h) performing computations on the data words of each data set in accordance with said variable to produce a computed data word;

i) inspecting said variable to determine if the computed data word is the double or single precision data; and j) if the step (i) determines that the computed data word is the double precision data, separating the computed data word into companion data segments of higher and lower significant bits and appending said tag to each of said separated companion data segments to form data packets and forwarding same to said ring bus, or if the step (i) determines that the computed data word is the single precision data, translating the computed data word to a data segment of single precision data format, appending said tag to the translated data segment to form a data packet and forwarding same to said ring bus.

* * * * *